(12) United States Patent
Moon et al.

(10) Patent No.: US 11,660,921 B2
(45) Date of Patent: May 30, 2023

(54) INDEPENDENT SUSPENSION SYSTEM

(71) Applicants: HYUNDAI MOTOR COMPANY, Seoul (KR); KIA MOTORS CORPORATION, Seoul (KR)

(72) Inventors: Ha Kyung Moon, Incheon (KR); Gab Bae Jeon, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 355 days.

(21) Appl. No.: 17/169,796

(22) Filed: Feb. 8, 2021

(65) Prior Publication Data

US 2022/0080795 A1 Mar. 17, 2022

(30) Foreign Application Priority Data

Sep. 14, 2020 (KR) .................. 10-2020-0117528

(51) Int. Cl.
*B60G 3/20* (2006.01)
*B62D 5/04* (2006.01)
(Continued)

(52) U.S. Cl.
CPC .............. *B60G 3/20* (2013.01); *B60K 7/001* (2013.01); *B60K 7/0007* (2013.01); *B62D 5/001* (2013.01); *B62D 5/0418* (2013.01); *B62D 7/18* (2013.01); *B60G 2200/144* (2013.01); *B60G 2204/416* (2013.01); *B60G 2206/50* (2013.01); *B60G 2800/162* (2013.01); *B60G 2800/24* (2013.01); *B60K 2007/0038* (2013.01); *B60K 2007/0092* (2013.01)

(58) Field of Classification Search
CPC . B60G 3/18; B60G 3/20; B60G 7/001; B60K 7/0007; B60K 2007/0092; B60K 2007/0038

See application file for complete search history.

(56) References Cited

U.S. PATENT DOCUMENTS 3,620,548 A * 11/1971 Van Winsen ............ B60G 3/20
267/221
9,085,302 B2 7/2015 Borroni-Bird et al.
(Continued)

FOREIGN PATENT DOCUMENTS

DE 102017216983 A1 3/2019
JP 2005-112300 A 4/2005

*Primary Examiner* — Brian L Swenson
(74) *Attorney, Agent, or Firm* — Morgan, Lewis & Bockius LLP

(57) ABSTRACT

An independent suspension system includes a wheel knuckle engaged with a wheel and configured to be rotated in response to a steering input; a motor assembly disposed at one end of the wheel knuckle and configured to rotate the wheel knuckle; an upper arm engaged with the motor assembly; a lower arm having a first end engaged with a vehicle body and a second end engaged with the wheel knuckle; a connection arm configured to be engaged with the upper arm; a rotation pin disposed at a connection portion between the upper arm and the connection arm to enable integral rotation of the upper arm and the connection arm; and a shock absorber disposed between the connection arm and the lower arm and engaged with the connection arm so as to be perpendicular to the connection arm.

8 Claims, 3 Drawing Sheets

(51) Int. Cl.
    *B60K 7/00*       (2006.01)
    *B62D 5/00*       (2006.01)
    *B60G 7/00*       (2006.01)
    *B62D 7/18*       (2006.01)

(56) References Cited

U.S. PATENT DOCUMENTS

| | | | |
|---|---|---|---|
| 11,577,778 B2* | 2/2023 | Kim | B60G 15/062 |
| 2005/0073126 A1* | 4/2005 | Seki | B60G 3/20 |
| | | | 280/124.152 |
| 2005/0146111 A1* | 7/2005 | Yamazaki | B62D 7/18 |
| | | | 280/124.135 |
| 2016/0052356 A1* | 2/2016 | Tamura | B62D 7/18 |
| | | | 280/124.126 |
| 2016/0052359 A1* | 2/2016 | Matayoshi | B60K 7/0007 |
| | | | 280/124.145 |
| 2021/0155290 A1* | 5/2021 | Chen | B60G 3/20 |
| 2021/0162826 A1* | 6/2021 | Senoo | B60G 11/08 |
| 2021/0300137 A1* | 9/2021 | Andou | B60G 3/20 |

* cited by examiner

FIG. 1 – PRIOR ART –

|  | INITIAL STATE | COMPARATIVE EXAMPLE 1 | EMBODIMENT 1 |
|---|---|---|---|
| SIZE OF BUMP OVER WHICH WHEEL TRAVELS | 0 | 50mm (200-150) | 50mm (200-150) |
| VARIATION IN LENGTH OF SHOCK ABSORBER | 0 | 23mm (367-344) | 17mm (367-310) |
| LEVER RATIO OF SHOCK ABSORBER | - | 0.46 (23/50) | 1.14 (50/57) |

INDEPENDENT SUSPENSION SYSTEM

CROSS-REFERENCE TO RELATED APPLICATION

This application claims the benefit of priority to Korean Patent Application No. 10-2020-0117528 filed on Sep. 14, 2020 in the Korean Intellectual Property Office, the entire contents of which are incorporated herein by reference.

TECHNICAL FIELD

The present disclosure relates to an independent suspension system configured to perform independent steering of each of wheels of a vehicle. More particularly, the present disclosure relates to an independent suspension system for improving a positional relationship between a motor assembly and a shock absorber so as to improve a lever ratio of the shock absorber when a wheel travels over a bump.

BACKGROUND

A conventional vehicle suspension system connects an axle and a vehicle body in order to prevent vibration or impact, which the axle receives from the road surface while the vehicle is running, from being directly transferred to the vehicle body, thereby preventing damage to the vehicle body or a cargo and improving ride comfort. In general, a suspension system includes a suspension spring, which mitigates impacts received from the road surface, a shock absorber, which dampens vibration of the suspension spring in order to improve ride comfort, and a stabilizer, which suppresses rolling of the vehicle.

A commercial vehicle mainly uses a solid-axle suspension system, in which the left wheel and the right wheel are connected via a single axle. A leaf spring or an air spring is mainly used as a suspension spring.

A steering system of a commercial vehicle, which uses a solid-axle suspension system, includes a pitman arm, which is rotatably mounted to an output shaft of a steering gear, a drag link, which transmits the movement of the pitman arm to a knuckle arm, the knuckle arm receiving movement of the drag link to operate a knuckle spindle, and a tie rod, which connects a left knuckle arm and a right knuckle arm.

In a commercial vehicle equipped with the solid-axle suspension system using an air spring and the steering system, which have been described above, the air spring merely serves as a substitute for a leaf spring, and does not greatly contribute to improving ride comfort or steering characteristics. In addition, it is difficult to achieve a precise geometry and to increase design freedom due to the structural characteristics thereof.

In recent years, there has been developed an independent-steering-type suspension system, in which a steering angle of a wheel is input to each suspension system through a motor assembly. However, the independent-steering-type suspension system described above has a problem in that a shock absorber needs to protrude in the height direction of a vehicle so as to be aligned with a steering shaft of the motor assembly.

In addition, as shown in FIG. 1, in a case in which one end of a shock absorber is fixed to a vehicle body frame, variation in the length of the shock absorber when the wheel travels over a bump is small, leading to deterioration in ride comfort.

For this reason, in recent years, a motor assembly has been required to have a shaft different from that of a shock absorber.

The above information disclosed in this Background section is only for enhancement of understanding of the background of the invention, and therefore it may contain information that does not form the related art that is already known in this country to a person of ordinary skill in the art.

SUMMARY OF THE DISCLOSURE

The present disclosure has been made in an effort to solve the above-described problems associated with the related art, and it is an object of the present disclosure to provide an independent suspension system enabling setting of a lever ratio of a shock absorber to a predetermined value or more even when a motor assembly is located at a lower end of an upper arm.

It is another object of the present disclosure to provide an independent suspension system configured such that a shock absorber is located so as to be perpendicular to a connection arm.

The objects of the present disclosure are not limited to the above-mentioned objects, and other objects not mentioned herein will be clearly understood by those skilled in the art from the following description, and will become apparent with reference to the embodiments of the present disclosure. In addition, the objects of the present disclosure can be accomplished by the components described in the appended claims and combinations thereof.

In one aspect, the present disclosure provides an independent suspension system including: a wheel knuckle configured to be engaged with a wheel and configured to be rotated in response to steering input, a motor assembly disposed at one end of the wheel knuckle and configured to rotate the wheel knuckle, an upper arm engaged with the motor assembly, a lower arm having a first end engaged with a vehicle body and a second end engaged with the wheel knuckle, a connection arm integrally formed with the upper arm, a rotation pin disposed at a connection portion between the upper arm and the connection arm to enable integral rotation of the upper arm and the connection arm, and a shock absorber disposed between the connection arm and the lower arm and engaged with the connection arm so as to be perpendicular to the connection arm.

The upper arm and the connection arm may be the same distance from the rotation pin.

The shock absorber may be configured to have a lever ratio of 0.9 to 1.2.

The independent suspension system may further include an in-wheel motor engaged with the wheel knuckle.

The motor assembly may be configured to rotate the wheel knuckle to a maximum of 180 degrees in the longitudinal direction of a vehicle.

The wheel knuckle may be configured to be rotated about an end thereof with which the upper arm and the motor assembly are engaged and an end thereof with which the lower arm is engaged.

The lower arm and the wheel knuckle may be engaged with each other through a ball joint or a universal joint.

Other aspects and exemplary embodiments of the disclosure are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
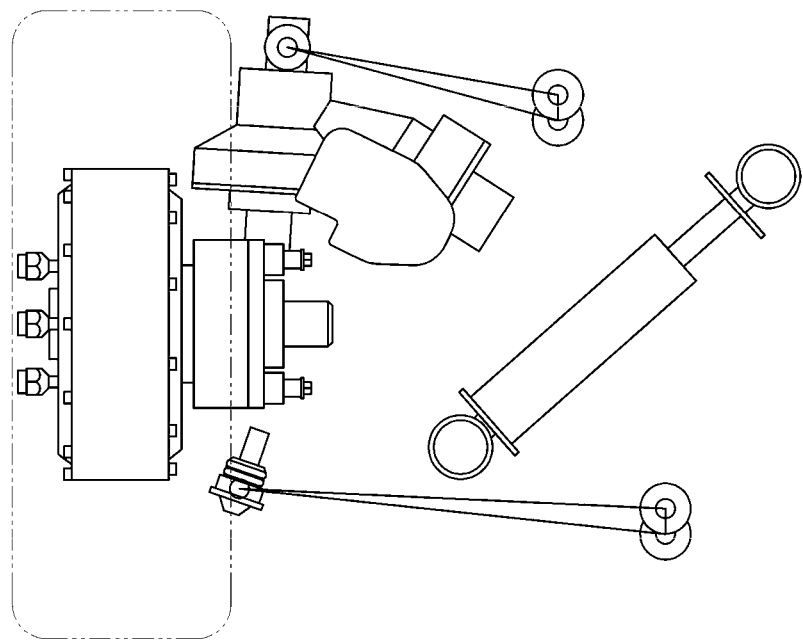
FIG. 1 is a view showing a suspension system according to a comparative example, in which one end of a shock absorber is disposed at a lower arm and the opposite end thereof is secured to a vehicle body frame.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

Hereinafter, exemplary embodiments of the present disclosure will be described in detail with reference to the accompanying drawings. The present disclosure may, however, be embodied in many different forms, and should not be construed as being limited to the embodiments set forth herein. Rather, these embodiments are provided so that the invention will be thorough and complete, and will fully convey the scope of the invention to those skilled in the art.

Further, the terms "-device", "-arm", and "-assembly" described in the specification mean units for processing at least one function or operation, and can be implemented by hardware components, software components, or combinations of hardware components and software components.

Furthermore, in the following description and the accompanying drawings, components having the same functional configurations are denoted by the same reference numerals, and a duplicate explanation thereof is omitted.

Figure 2:
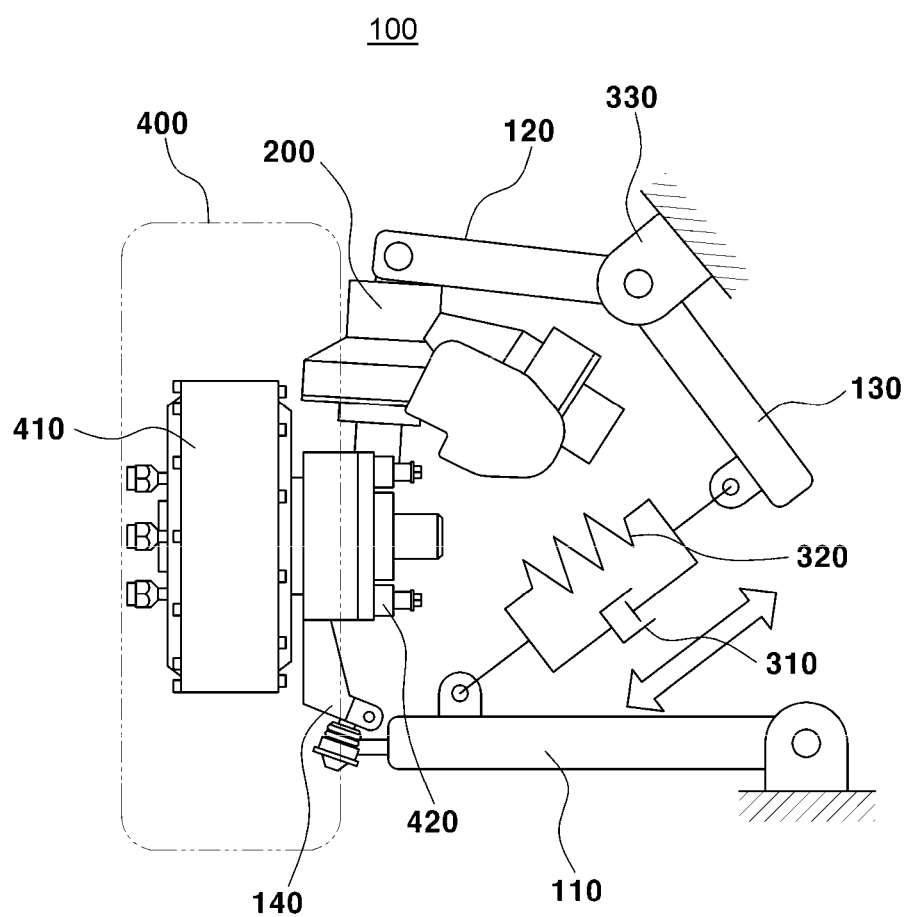
FIG. 2 is a view showing a configuration of an independent suspension system according to an embodiment of the present disclosure.

FIG. 2 is a view showing the configuration of an independent suspension system of the present disclosure.

A suspension system 100 of the present disclosure includes an in-wheel motor 410, which is disposed inside a wheel 400 to apply rotational driving force to the wheel 400, and a wheel knuckle 140, which is engaged with the wheel 400 including the in-wheel motor 410. In addition, the suspension system 100 further includes a braking device 420, which is disposed at one end thereof that is adjacent to the in-wheel motor 410. The wheel knuckle 140 directly receives driving force from a motor assembly 200, which is disposed at the upper end of the wheel knuckle 140, and rotates the wheel 400 leftwards and rightwards with respect to a longitudinal direction of the vehicle. The wheel knuckle 140 may be driven by a controller such that each wheel 400 is controlled in response to a user's steering input.

The controller performs control such that the rotational force of the motor assembly 200 is applied to the wheel knuckle 140 in order to control the wheel 400 to be operated to a steering angle corresponding to steering input. The upper end of the wheel knuckle 140 is engaged with a rotor of the motor assembly 200, and the lower end of the wheel knuckle 140 is engaged with one end of a lower arm 110. The lower end of the wheel knuckle 140 may be engaged with the lower arm 110 through a ball joint or a universal joint. The lower end portion of the wheel knuckle 140 is rotated about the joint of the lower arm 110 in response to the rotational force of the motor assembly 200 in the width direction of the vehicle.

That is, the wheel knuckle 140 is rotated about the end thereof with which an upper arm 120 and the motor assembly 200 are engaged and the end thereof with which the lower arm 110 is engaged. Further, in one embodiment of the present disclosure, the motor assembly 200 may be configured to rotate the wheel knuckle 140 in both directions to a maximum of 180 degrees.

The motor assembly 200 includes a rotor, which is disposed at the center portion thereof, and a stator, which is disposed so as to surround at least a portion of the rotor. One end of the stator is engaged with the upper arm 120 such that the movement of the motor assembly 200 in the upward-downward direction is transmitted to the upper arm 120. In one embodiment of the present disclosure, at least a portion of the rotor is engaged with the wheel knuckle 140 such that the wheel knuckle 140 is rotated simultaneously with the rotor.

The present disclosure includes a connection arm 130, which is disposed at the opposite end of the upper arm 120 and forms a predetermined angle with the upper arm 120. The present disclosure includes a rotation pin 330, which is disposed at the connection point between the connection arm 130 and the upper arm 120. The rotation pin 330 is connected to a sub-frame or a frame of the vehicle body via a bushing. That is, the upper arm 120 and the connection arm 130 are rotated in an interlocked manner about the rotation pin 330 in response to the displacement applied to the motor assembly 200 in the upward-downward direction.

The present disclosure includes a shock absorber 310 which is arranged between the connection arm 130 and the lower arm 110 and is engaged with the connection arm 130 so as to be perpendicular to the longitudinal direction of the connection arm 130. The shock absorber 310 may employ a hydraulic suspension, a gas suspension, a variable suspension, or an electronically controlled suspension. In addition, the present disclosure may include a suspension spring 320 configured to surround the shock absorber 310.

Respective ends of the shock absorber 310 may be hinged to the connection arm 130 and the lower arm 110. Thus, the shock absorber 310 absorbs the displacement applied to the connection arm 130 and the lower arm 110.

Figures 3, 4:
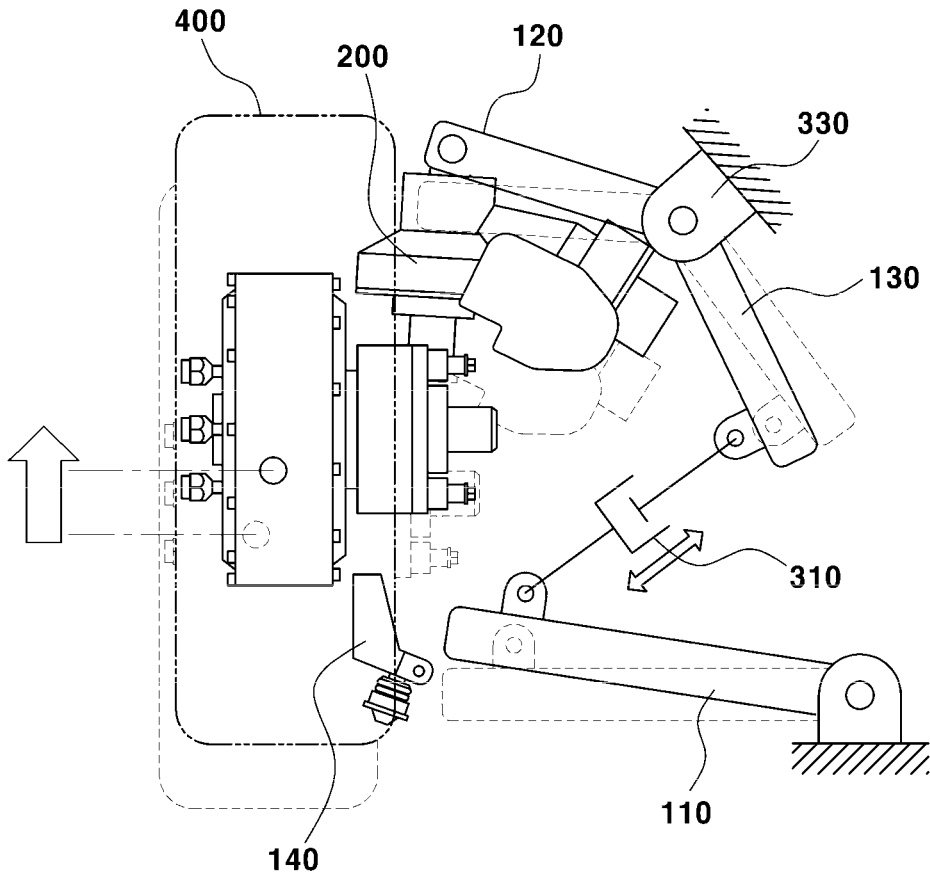
FIG. 3 is a view showing an operation of an independent suspension system when a wheel travels over a bump according to an embodiment of the present disclosure.
FIG. 4 is a table showing comparison data on a displacement value of a shock absorber between a comparative example and an embodiment of the present disclosure when a wheel travels over a bump.

FIG. 3 is a view showing an operation of an independent suspension system 100 when the wheel 400 travels over a bump according to an embodiment of the present disclosure.

When the vehicle travels on a bumpy road, each independent suspension system 100 is subjected to a shock attributable to a bump over which the wheel 400 travels. When the wheel 400 travels over a bump, one end of the upper arm 120 and one end of the lower arm 110, which are disposed close to the wheel 400, are rotated in an upward-downward direction about the opposite end of the upper arm 120 and the opposite end of the lower arm 110, which are engaged with a vehicle body frame.

When the wheel 400 travels over a bump, the center point of the wheel 400 is moved in a height direction of the vehicle, and the wheel knuckle 140, which is engaged with the wheel 400, is also moved in the height direction of the vehicle by a height equivalent to the size of the bump over which the wheel 400 travels.

In addition, the motor assembly 200, which is engaged with the upper end of the wheel knuckle 140, and one end of the upper arm 120, which is engaged with one end of the motor assembly, are moved in the same direction as the direction in which the shock attributable to the wheel 400 traveling over a bump is applied. As shown in FIG. 3, when one end of the upper arm 120 is moved in the clockwise direction, the distal end of the connection arm 130, integrally formed with the upper arm 120 with the rotation pin 330 interposed therebetween, is also rotated in the clockwise direction about the rotation pin 330.

When the wheel 400 travels over a bump, one end of the lower arm 110, which is engaged with the lower end portion of the wheel knuckle 140, is rotated in the clockwise direction about the opposite end thereof, which is engaged with the vehicle body frame.

Therefore, when the wheel 400 travels over a bump, the distal end of the connection arm 130 and the end of the lower arm 110 that is engaged with the wheel knuckle 140 are moved close to each other, and the shock absorber 310, which is disposed between the connection arm 130 and the lower arm 110, enters a compressed state.

A lever ratio of the shock absorber 310 of the present disclosure may be a value obtained by dividing variation in the length of the shock absorber 310 by the distance that the central axis of the wheel 400 is moved in the upward-downward direction of the vehicle when the wheel 400 travels over a bump. Here, the lever ratio of the shock absorber 310 may be set to 0.9 to 1.2 with respect to the size of the bump over which the wheel 400 travels.

According to the present disclosure, the connection arm 130 is secured to the upper arm 120 and the rotation pin 330, and the shock absorber 310 is disposed between the connection arm 130 and the lower arm 110, with the result that the shock absorber 310 is displaced to an extent similar to the size of the bump over which the wheel 400 travels.

In the embodiment of the present disclosure illustrated in the drawings, the upper arm 120 and the connection arm 130 are formed so as to have the same length and to form a predetermined angle therebetween such that the lever ratio of the shock absorber 310 is 1.14 with respect to the size of the bump over which the wheel 400 travels.

In summary, in the vehicle including the independent steering system, when the wheel 400 travels over a bump, the connection arm 130 is rotated about the rotation pin 330, and the distance between the connection arm 130 and the lower arm 110 is varied. In this way, the shock absorber 310 is compressed or extended. In one embodiment of the present disclosure, the connection arm 130 is rotated to a position close to the lower arm 110, and the lower arm 110 is also rotated to a position close to the connection arm 130 at the same time, with the result that the amount of compression of the shock absorber 310 is substantially the same as the size of the bump over which the wheel 400 travels.

FIG. 4 shows data on the size of the bump over which the wheel 400 travels and the displacement value of the shock absorber 310 depending on the size of the bump over which the wheel 400 travels when the shock absorber 310 is disposed between the connection arm 130 and the lower arm 110 according to an embodiment of the present disclosure.

In the suspension system according to the comparative example, in which one end of the shock absorber 310 is engaged with the vehicle body frame and the opposite end thereof is located at the lower arm 110, data measured when the wheel 400 travels over a bump is as follows.

In the comparative example shown in FIG. 1, in which the shock absorber 310 is obliquely engaged with the vehicle body frame and the lower arm 110, when the size of the bump over which the wheel 400 travels is 50 mm, variation in the length of the shock absorber 310 is measured to be 23 mm, and the lever ratio of the shock absorber 310 is therefore 0.46.

On the other hand, in the independent suspension system according to an embodiment of the present disclosure, in which the upper arm 120 and the connection arm 130 have the same length, when the size of the bump over which the wheel 400 travels is 50 mm, variation in the length of the shock absorber 310 is measured to be 57 mm, and the lever ratio of the shock absorber 310 is therefore 1.14.

That is, according to the present disclosure, the shock absorber 310 is disposed between the connection arm 130 and the lower arm 110, and the distance between the connection arm 130 and the lower arm 110 decreases when the wheel 400 travels over a bump, whereby the lever ratio of the shock absorber 310 has a value substantially close to 1.

As is apparent from the above description, the present disclosure may obtain the following effects through the above embodiments and through the configurations and combination and use relationships described above.

The present disclosure may lower the position of a motor assembly through the position of a shock absorber directly connected to a connection arm, thereby lowering the center of gravity.

In addition, the present disclosure may increase the lever ratio of the shock absorber, thereby providing a high degree of freedom.

In addition, the present disclosure has an effect of requiring low damping force in order to perform wheel steering by increasing the lever ratio of the shock absorber.

The above description is illustrative of the present disclosure. Further, the above disclosure is intended to illustrate and explain exemplary embodiments of the present disclosure, and the present disclosure may be used in various other combinations, modifications, and environments. In other words, the present disclosure may be changed or modified within the scope of the concept of the disclosure disclosed herein, within the equivalent scope of the disclosure, and/or within the skill and knowledge of the art. The described embodiments illustrate the best state of the art to implement the technical idea of the present disclosure, and various changes may be made thereto as demanded for specific applications and uses of the present disclosure. Accordingly, the above description is not intended to limit the present disclosure to the embodiments. Also, the appended claims should be construed as encompassing such other embodiments.

What is claimed is:

1. An independent suspension system, comprising:
   a wheel knuckle configured to be engaged with a wheel and configured to be rotated in response to a steering input;
   a motor assembly disposed at one end of the wheel knuckle, the motor assembly being configured to rotate the wheel knuckle;
   an upper arm configured to be engaged with the motor assembly;
   a lower arm having a first end engaged with a vehicle body and a second end engaged with the wheel knuckle;
   a connection arm configured to be engaged with the upper arm;
   a rotation pin disposed at a connection portion between the upper arm and the connection arm, the rotation pin configured to enable integral rotation of the upper arm and the connection arm; and
   a shock absorber disposed between the connection arm and the lower arm, and the shock absorber configured to be engaged with the connection arm so as to be perpendicular to the connection arm.

2. The independent suspension system of claim 1, wherein a distance between the upper arm and the rotation pin and a distance between the connection arm the rotation pin are the same.

3. The independent suspension system of claim 1, wherein the shock absorber is configured to have a lever ratio of 0.9 to 1.2.

4. The independent suspension system of claim 1, further comprising an in-wheel motor configured to be engaged with the wheel knuckle.

5. The independent suspension system of claim 1, wherein the motor assembly is configured to rotate the wheel knuckle to a maximum of 180 degrees in a longitudinal direction of a vehicle.

6. The independent suspension system of claim 1, wherein the wheel knuckle is configured to be rotated about a first end of the wheel knuckle, with which the upper arm and the motor assembly are engaged, and a second end of the wheel knuckle with which the lower arm is engaged.

7. The independent suspension system of claim 1, wherein the lower arm and the wheel knuckle are configured to be engaged with each other through a ball joint or a universal joint.

8. The independent suspension system of claim 1, further comprising a suspension spring configured to surround the shock absorber.

* * * * *